United States Patent
Zhang et al.

(10) Patent No.: US 10,111,220 B2
(45) Date of Patent: Oct. 23, 2018

(54) CHANNEL ACCESS IN VEHICULAR COMMUNICATION NETWORK

(71) Applicant: Harman International Industries, Incorporated, Stamford, CT (US)

(72) Inventors: Qingshan Zhang, Shanghai (CN); Zeng Yang, Shanghai (CN); Guoxia Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 95 days.

(21) Appl. No.: 15/038,137

(22) PCT Filed: Nov. 20, 2013

(86) PCT No.: PCT/CN2013/087466
§ 371 (c)(1),
(2) Date: May 20, 2016

(87) PCT Pub. No.: WO2015/074185
PCT Pub. Date: May 28, 2015

(65) Prior Publication Data
US 2016/0286550 A1    Sep. 29, 2016

(51) Int. Cl.
*H04W 72/04*    (2009.01)
*H04W 74/00*    (2009.01)

(52) U.S. Cl.
CPC ..... *H04W 72/0446* (2013.01); *H04W 74/002* (2013.01); *H04W 72/044* (2013.01); *H04W 72/048* (2013.01)

(58) Field of Classification Search
CPC ............ H04W 72/04; H04W 72/0446; H04W 72/044; H04W 74/002; H04B 7/216; H04J 3/00
See application file for complete search history.

(56) References Cited

U.S. PATENT DOCUMENTS 9,635,705 B2 *  4/2017  Lu .......................... H04W 84/00
2009/0296680 A1 * 12/2009  Suzuki .............. H04W 72/0406
                                                                370/342

(Continued)

FOREIGN PATENT DOCUMENTS

CN      102695287 A     9/2012
JP      2003189352 A    7/2003
JP         4568759 B2   10/2010

OTHER PUBLICATIONS

ISA State Intellectual Property Office of the People's Republic of China, International Search Report and Written Opinion Issued in Application No. PCT/CN2013/087466, dated Sep. 3, 2014, WIPO, 12 pages.

(Continued)

*Primary Examiner* — Wei Zhao
(74) *Attorney, Agent, or Firm* — McCoy Russell LLP

(57) ABSTRACT

A method and a system for accessing a channel in a vehicular communication network are provided, where successive cycles each of which includes N time slots are defined in the channel. The method may include: a first communication device mounted on a first node receiving a channel allocation advertisement message from a second communication device mounted on a second node, where the channel allocation advertisement message includes information of how a communication area is divided into M regions and a mapping between the M regions and the N time slots; the first communication device determining in which region the first node is located based on the position of the first node and the information; the first communication device identifying a time slot based on the determined region and the mapping; and the first communication device competing for the identified time slot.

16 Claims, 5 Drawing Sheets

(56) References Cited

U.S. PATENT DOCUMENTS

2012/0120883 A1    5/2012  Chen et al.
2013/0136095 A1*   5/2013  Nishio .................. H04L 5/0007
                                                   370/329
2013/0279382 A1*  10/2013  Park .................... H04W 74/085
                                                   370/311

OTHER PUBLICATIONS

Nagaosa, T. et al., "An Advanced CSMA Inter-vehicle Communication System Using Packet Transmission Timing Decided by the Vehicle Position," Proceedings of the 2004 IEEE Intelligent Vehicles Symposium, Jun. 14, 2004, Parma, Italy, 4 pages.

Chung, H. et al., "Time Slot Allocation Based on Region and Time Partitioning for Dynamic TDD-OFDM Systems," Proceedings of the IEEE 63rd Vehicular Technology Conference, May 7, 2006, Melbourne, Australia, 6 pages.

Ohmori, M. et al., "Adaptive Location Based TDM Protocol for Inter-Vehicle Communication," Proceedings of the 2009 IEEE Vehicular Networking Conference, Oct. 28, 2009, Tokyo, Japan, 8 pages.

Lai, Y. et al., "A Region-Based Clustering Mechanism for Channel Access in Vehicular Ad Hoc Networks," IEEE Journal on Selected Areas in Communications, vol. 29, No. 1, Jan. 2011, 12 pages.

Wu, H. et al., "Distributed Location-Assisted Multiple Access Scheme for Vehicular Ad Hoc Networks," Proceedings of the 2013 8th International Conference on Communications and Networking in China (CHINACOM), Aug. 14, 2013, Guilin, China, 6 pages.

European Patent Office, Extended European Search Report Issued in Application No. 13897990.1, dated Jun. 21, 2017, Germany, 12 pages.

\* cited by examiner

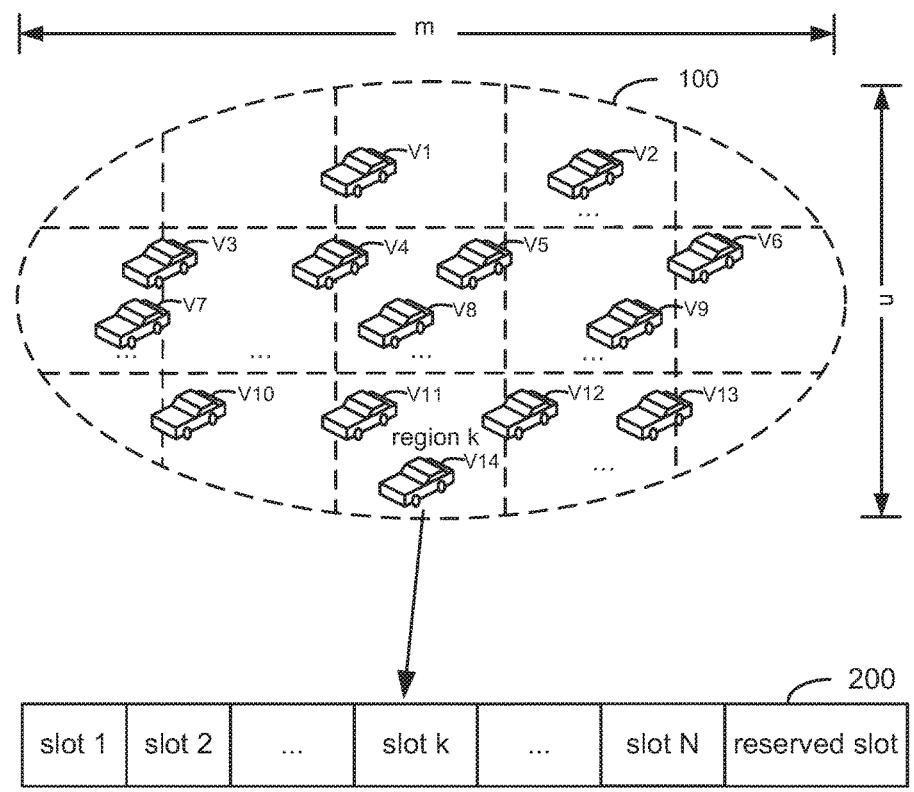

CHANNEL ACCESS IN VEHICULAR COMMUNICATION NETWORK

CROSS REFERENCE TO RELATED APPLICATIONS

The present application is a U.S. National Phase of International Patent Application Serial No. PCT/CN2013/087466, entitled "CHANNEL ACCESS IN VEHICULAR COMMUNICATION NETWORK," filed on Nov. 20, 2013, the entire contents of which are hereby incorporated by reference for all purposes.

TECHNICAL FIELD

The present disclosure generally relates to channel access in a vehicular communication network.

BACKGROUND

In the Wireless Access in Vehicular Environment (WAVE) standard, Synchronization Intervals (Sync interval), such as 100 ms long intervals, are defined for channel coordination and channel synchronization. Each Sync interval is further divided into a 50 ms long Control Channel (CCH) interval and a 50 ms long Service Channel (SCH) interval. To prevent access collision, a mechanism of Carrier Sense Multiple Access with Collision Avoidance (CSMA/CA) is used.

SUMMARY

In one embodiment, a method for accessing a channel in a vehicular communication network is provided, where successive cycles, each of which includes N time slots, are defined in the channel. The method may include: a first communication device mounted on a first node receiving a channel allocation advertisement message from a second communication device mounted on a second node, where the channel allocation advertisement message includes information of how a communication area is divided into M regions and a mapping between the M regions and the N time slots; the first communication device determining in which region the first node is located based on the position of the first node and the information; the first communication device identifying a time slot based on the determined region and the mapping; and the first communication device competing for the identified time slot.

In some embodiments, the communication area may be determined based on position information and communication radius of the second node.

In some embodiments, the channel allocation advertisement message may further include a life time of itself, after which the channel allocation advertisement message is expired.

In some embodiments, the channel allocation advertisement message may further include a time stamp indicating a time point at which the channel allocation advertisement message is broadcasted. If the first communication device receives a plurality of channel allocation advertisement messages, the first communication device may compete for a time slot according to a channel allocation advertisement message with an earliest time stamp.

In some embodiments, the mapping may be established based on a Hash function.

In one embodiment, a method for accessing a channel in a vehicular communication network is provided, where successive cycles, each of which includes N time slots, are defined in the channel. The method may include: a first communication device mounted on a first node receiving a channel allocation advertisement message from a second communication device mounted on a second node, where the channel allocation advertisement message includes a mapping between the N time slots and a plurality of nodes which mapping is established based on positions of the nodes; the first communication device identifying a time slot based on the mapping; and the first communication device competing for the identified time slot.

In one embodiment, a method for accessing a channel in a vehicular communication network is provided, where successive cycles, each of which includes N time slots, are defined in the channel. The method may include: a communication device mounted on a node identifying a time slot based on its position information; and the communication device competing for the identified time slot.

In some embodiments, the communication device may identify the time slot based on a mapping between the N time slots and a plurality of nodes, where the mapping may be established based on position information of the nodes.

In one embodiment, a method for accessing a channel in a vehicular communication network is provided, where successive cycles, each of which includes N time slots, are defined in the channel. The method may include: a first communication device mounted on a first node obtaining a communication area based on position information and communication radius of the first node; the first communication device dividing the communication area into M regions; and the first communication device broadcasting a channel allocation advertisement message comprising a mapping between the M regions and the N time slots to inform nodes within the communication area that each of the nodes can compete for a time slot assigned to a region where it locates according to the mapping.

In some embodiments, the channel allocation advertisement message may further include a life time of itself, after which the first communication device broadcasts a new channel allocation advertisement message.

In some embodiments, the mapping may be established based on a Hash function.

In one embodiment, a system for accessing a channel in a vehicular communication network is provided, where successive cycles, each of which includes N time slots, are defined in the channel. The system may include: a transceiver, a positioning device to obtain position information of a first node on which the system is mounted, and a processing device configured to: after the transceiver receives a channel allocation advertisement message from a communication device mounted on a second node, where the channel allocation advertisement message includes information of how a communication area is divided into M regions and a mapping between the M regions and the N time slots, determine in which region the first node is located based on the position of the first node and the information; identify a time slot based on the determined region and the mapping; and control the system to compete for the identified time slot.

In some embodiments, the communication area may be determined based on position information and communication radius of the second node.

In some embodiments, the channel allocation advertisement message may further include a life time of itself, after which the channel allocation advertisement message is expired.

In some embodiments, the mapping may be established based on a Hash function.

In one embodiment, a system for accessing a channel in a vehicular communication network is provided, where successive cycles, each of which includes N time slots, are defined in the channel. The system may include: a transceiver, a positioning device to obtain position information of a first node on which the system is mounted, and a processing device configured to: obtain a communication area based on the position information and communication radius of the first node; divide the communication area into M regions; generate a channel allocation message which includes a scheme of allocation of the N time slots among the M regions; and control the transceiver to broadcast the channel allocation message to inform nodes within the communication area that each of the nodes can compete for a time slot allocated to a region where it locates according to the scheme.

In some embodiments, the channel allocation message may further include a life time of itself, where the processing device may be further configured to control the transceiver to broadcasts a new channel allocation message after the life time expires.

In some embodiments, the allocation scheme may be established based on a Hash function.

In one embodiment, a system for accessing a channel in a vehicular communication network is provided, where successive cycles, each of which includes N time slots, are defined in the channel. The system may include: means for obtaining position information of a first node on which the system is mounted; means for receiving a channel allocation advertisement message from a communication device mounted on a second node, where the channel allocation advertisement message includes information of how a communication area is divided into M regions and a mapping between the M regions and the N time slots; means for determining in which region the first node is located based on the position of the first node and the information; means for identifying a time slot based on the determined region and the mapping; and means for competing for the identified time slot.

In one embodiment, a system for accessing a channel in a vehicular communication network is provided, where successive cycles, each of which includes N time slots, are defined in the channel. The system may include: means for obtaining position information of a first node on which the system is mounted; means for obtaining a communication area based on the position information and communication radius of the first node; means for dividing the communication area into M regions; means for generating a channel allocation advertisement message which includes a mapping between the M regions and the N time slots; and means for broadcasting the channel allocation advertisement message to inform nodes within the communication area that each of the nodes can compete for a time slot assigned to a region where it locates according to the mapping.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 schematically illustrates an example of a channel allocation advertisement message;

FIG. 6 schematically illustrates an example of a mapping between time slots and regions.

DETAILED DESCRIPTION

Figure 1:
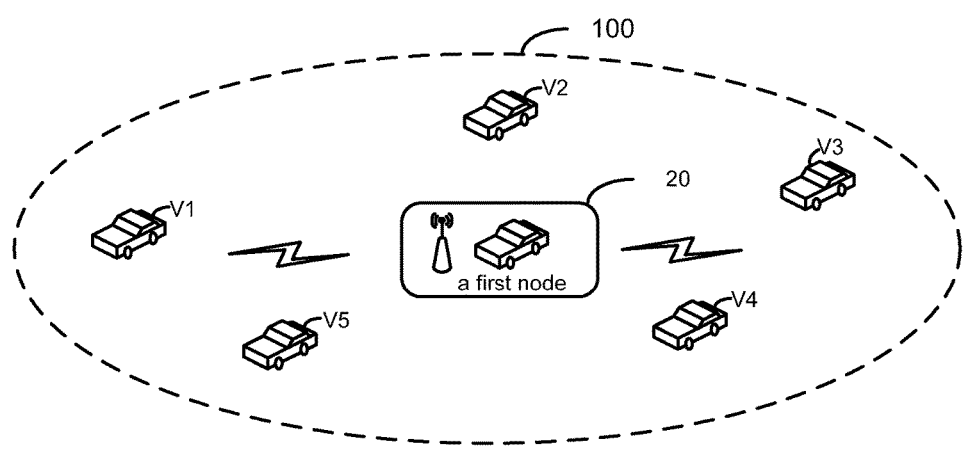
FIG. 1 schematically illustrates a vehicular communication network according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

It should be noted that, the terms "first", "second", and the like in the description and in the claims, are used for distinguishing between similar elements and not tend to describe a particular sequential and chronological order.

In conventional channel access mechanisms, vehicles keep sensing a channel (CCH or SCH) before access the channel. If the channel is available, all vehicles in a communication area try to compete for the channel resource, which may lead to a large number of channel access collisions. In a high node density environment, channel access efficiency will be degraded.

FIG. 1 schematically illustrates a vehicular communication network according to one embodiment.

For example, as shown in FIG. 1, there are a plurality of nodes (vehicle V1, vehicle V2, vehicle V3, vehicle V4 and vehicle V5) within a communication area 100 of a first node 20. The communication area 100 may be calculated based on position information and communication radius of the first node 20. The first node 20 may be a Roadside Unit (RSU), an On-board Unit (OBU) or a pedestrian device.

Figure 2:
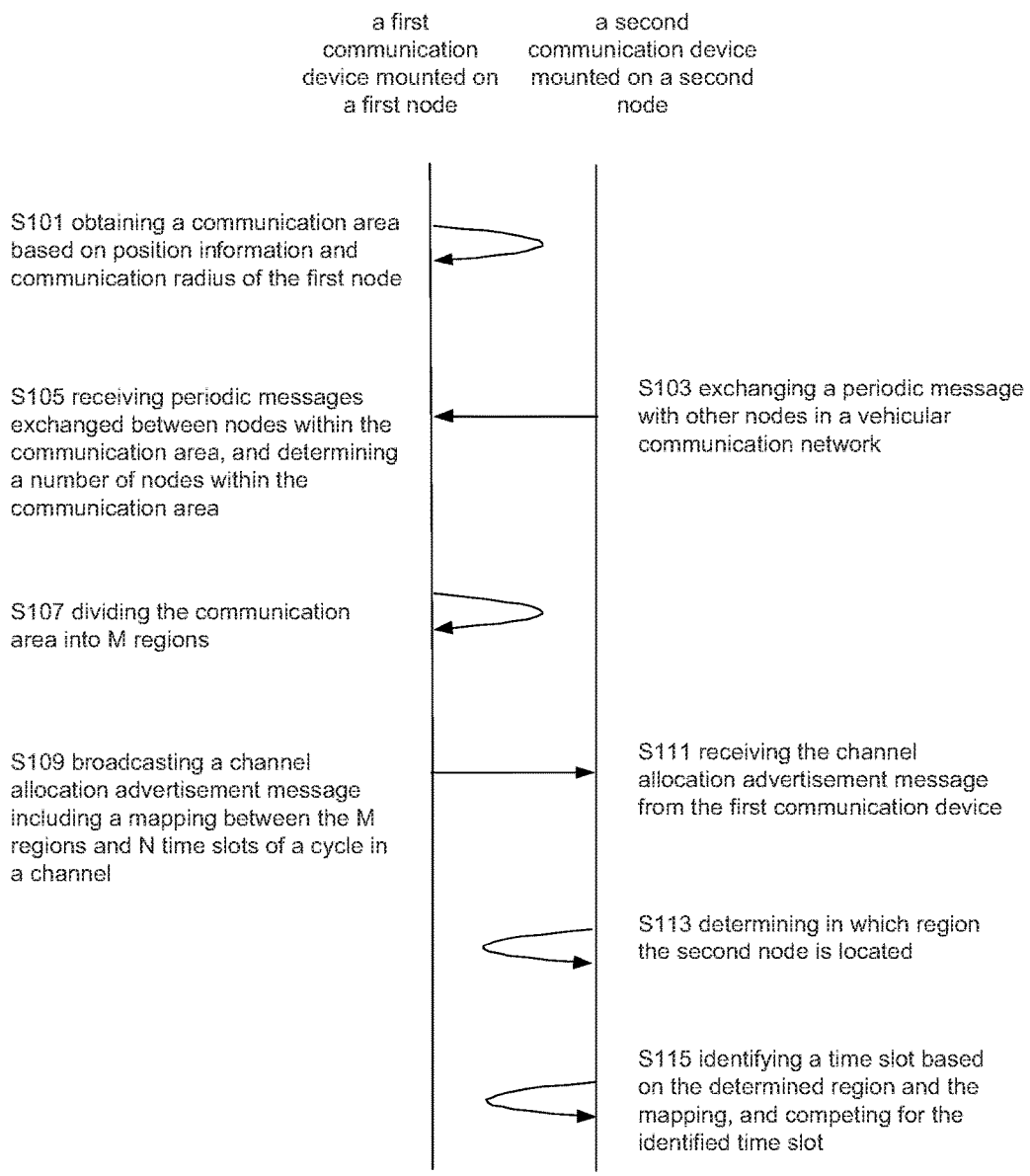
FIG. 2 illustrates a schematic flow chart of a method for accessing a channel in a vehicular communication network according to one embodiment.

FIG. 2 illustrates a schematic flow chart of a method 10 for accessing a channel in a vehicular communication network according to one embodiment.

Referring to FIG. 2, in S101, a first communication device mounted on a first node obtains a communication area based on position information and communication radius of the first node.

In some embodiments, the first communication device may first obtain the position information of the first node from a positioning device (e.g., a Global Position System (GPS)) mounted on the first node, and then calculate the communication area based on the position information and communication radius of the first node.

In S103, a second communication device mounted on a second node exchanges a periodic message with other nodes in a vehicular communication network.

In some embodiments, the periodic message may be a Basic Safety Message (BSM). The BSM is broadcasted ten times per second in the vehicular communication network according to the WAVE standard. The BSM may include information of the second node, such as position, velocity, acceleration status and braking status information. In some embodiments, the BSM may be broadcasted in the CCH.

In S105, the first communication device receives periodic messages exchanged between nodes within the communication area, and determines a number of nodes within the communication area.

In some embodiments, the first communication device may monitor the CCH to receive the BSMs exchanged between nodes within the communication area. By receiving periodic messages from different nodes, the first communication device could determine the number of nodes within the communication area.

In S107, the first communication device divides the communication area into M regions.

Figure 3:
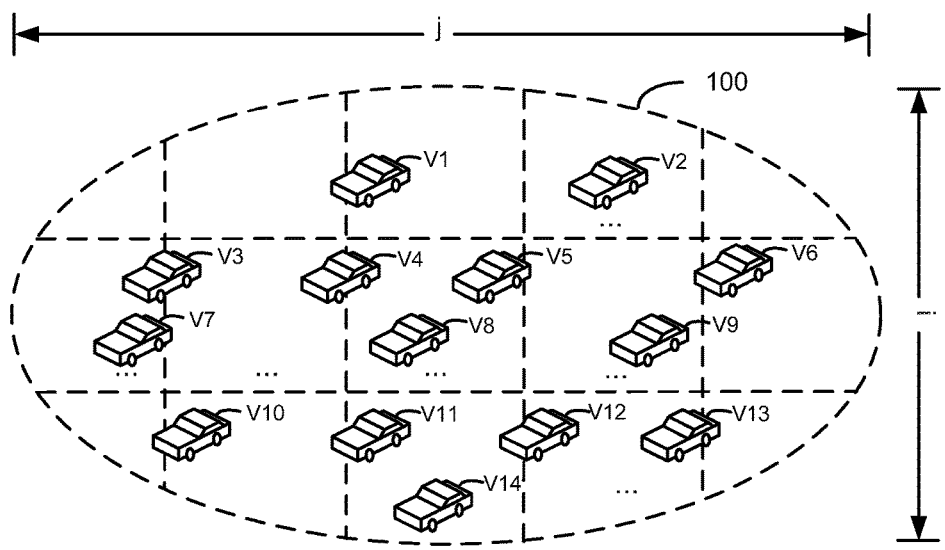
FIG. 3 schematically illustrates an example of a communication area divided into a plurality of regions.

FIG. 3 illustrates an example of how the communication area 100 is divided into M regions.

As shown in FIG. 3, the first communication device divides the communication area 100 into M regions with i rows and j columns. In some embodiments, the number of the regions may be determined based on the number of nodes within the communication area in order to avoid that too many vehicles are within a same region. In some embodiments, the number of the regions may be a predetermined number. In some embodiments, the regions may have a square shape, rectangular shape, a hexagonal shape or an irregular shape.

In S109, the first communication device broadcasts a channel allocation advertisement message including a mapping between the M regions and N time slots of a cycle in a channel.

After the communication area is divided into a plurality of regions, a cycle may be divided into a plurality of time slots according to the number of the regions. In some embodiments, the cycle may be the CCH interval. In some embodiments, the cycle may be the SCH interval. In some embodiments, the cycle may be the CCH interval and the SCH interval. In some embodiments, the number of time slots of a cycle may be predetermined.

Figure 4:
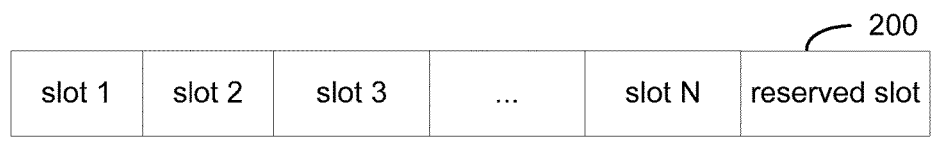
FIG. 4 schematically illustrates a slotted frame structure of a cycle according to one embodiment.

FIG. 4 schematically illustrates a slotted frame structure of a cycle according to one embodiment.

In some embodiments, referring to FIG. 4, a cycle 200 is divided into N isometric time slots (slot 1, slot 2, slot 3 . . . slot N) and a reserved time slot which is reserved for other purposes. The number of the isometric time slots N may be equal to the number of the regions M. The reserved time slot may be at the tail of the cycle 200.

In some embodiment, the cycle may be divided into N isometric time slots. The number of the isometric time slots N is greater or less than the number of the regions M.

In some embodiments, the first communication device may broadcast the channel allocation advertisement message in the CCH.

FIG. 5 schematically illustrates an example of a channel allocation advertisement message 300.

Referring to FIG. 5, the channel allocation advertisement message 300 includes a mapping function and mapping parameters. The mapping function and the mapping parameters indicate the mapping between the N time slots and the M regions. The mapping function and the mapping parameters may be used to map a node in a region of the communication area to a time slot of the cycle based on position information of the node. In some embodiments, the mapping function may be a Hash function, and the mapping parameters are the number of the regions and the number of the time slots. In some embodiments, the mapping function may be a predefined function.

Referring to FIG. 5, the channel allocation advertisement message 300 may further include position information and communication radius of the first node, which indicate position and range of the communication area. The position information and the communication radius of the first node may be used to determine whether a node received the channel allocation advertisement message is in the communication area. In some embodiments, the channel allocation advertisement message 300 may further include a life time of itself. The life time of the channel allocation advertisement message indicates the valid period of the mapping between the N time slots and the M regions. The first communication device may broadcast a new channel allocation advertisement message after the mapping is expired. In some embodiments, the channel allocation advertisement message 300 may further include a time stamp indicating a time point at which the channel allocation advertisement message is broadcasted. The time stamp may be used to determine which channel allocation advertisement message is broadcasted first. If the second communication device mounted on the second node receives a plurality of channel allocation advertisement messages, the second communication device may compete for a time slot according the first broadcasted channel allocation advertisement message.

In S111, the second communication device receives the channel allocation advertisement message from the first communication device.

In S113, the second communication device determines in which region the second node is located.

In some embodiments, after receiving the channel allocation advertisement message, the second communication device may obtain position information of the second node from a positioning device (e.g., a GPS device) mounted on the second node. Then the second communication device may determine in which region the second node is located based on the second node's position information.

In S115, the second communication device identifies a time slot based on the determined region and the mapping, and competes for the identified time slot.

In some embodiments, the mapping between the N time slots and the M regions may be established based on a Hash Function. The second communication device may extract the mapping function and the mapping parameters from the channel allocation advertisement message to obtain an index of a time slot assigned to the region where the second node locates.

For example, the second communication device obtains the index of the time slot according to equation (1):

$$I = (y\%n)*m + x\%m \qquad \text{equation (1)}$$

where I represents the index of the time slot assigned to the region where the second node locates; x represents an abscissa corresponding to the longitude of the second communication device; y represents an ordinate corresponding to the latitude of the second communication device; "%" represents a modulo operator; and the communication area is divided into m*n regions.

In some embodiments, the mapping between the N time slots and the M regions may be established based on a predefined function. For example, a mapping between indexes of the N time slots and indexes of the M regions are predefined in the predefined function. After receiving the channel allocation advertisement message, the second communication device may determine an index of the region in which the second node is located, and then obtain an index of a time slot according to the index of the region and the predefined function.

It should be noted that, after mapping the M regions to the N time slot, nodes in a same region will share a same time slot for data transmission. For example, as shown in FIG. 6, the vehicle V11 and the vehicle V14 in the region k will share the time slot k.

In some embodiments, CSMA/CA mechanism, ALOHA mechanism or other mechanisms may be adopted for channel resource competition among the vehicles in a same region.

For example, the vehicle V11 and the vehicle V14 in the region k will share the time slot k, and CSMA/CA mechanism is adopted for channel resource competition. Prior to transmitting, the vehicle V11 first listens to the channel during the time slot k to determine whether another vehicle in the region k is transmitting. If another vehicle is detected, the vehicle V11 waits for a period for the another vehicle to stop transmitting. In some embodiments, Request to Send (RTS)/Clear to Send (CTS) messages may be used in the CSMA/CA mechanism to mediate access to the channel during the time slot k. The vehicle V11 transmits a RTS message. If the vehicle V11 received a CTS message, the vehicle V11 transmits in the channel.

Because the vehicular communication environment is highly dynamic, the mapping between the N time slots and the M regions do not remain static and need to be refreshed frequently. In some embodiments, after the life time of the channel allocation advertisement message is expired, the second communication device mounted on the second node may generate and broadcast a new channel allocation advertisement message to indicate a new round of channel resource allocation.

It should be noted that the reserved time slot at the tail of the cycle may be allocated to vehicles which do not support the method for channel access according to embodiments in this disclosure. In some embodiments, those vehicles may compete to access the channel during the reserved time slot, so that communication efficient may not be degraded.

By using method according to embodiments of the disclosure, the channel access collisions among vehicles will be reduced greatly since channel resources are allocated relatively uniformly. Since nodes are usually distributed uniformly on the road and the mapping between the time slots and the regions is based on position information, the allocation of channel resources is relatively uniform. Therefore, the method could make full use of the channel resource, which thereby improves communication efficiency of the channel.

According to one embodiment of the present disclosure, a system for accessing a channel in a vehicular communication network is provided.

Figure 7:
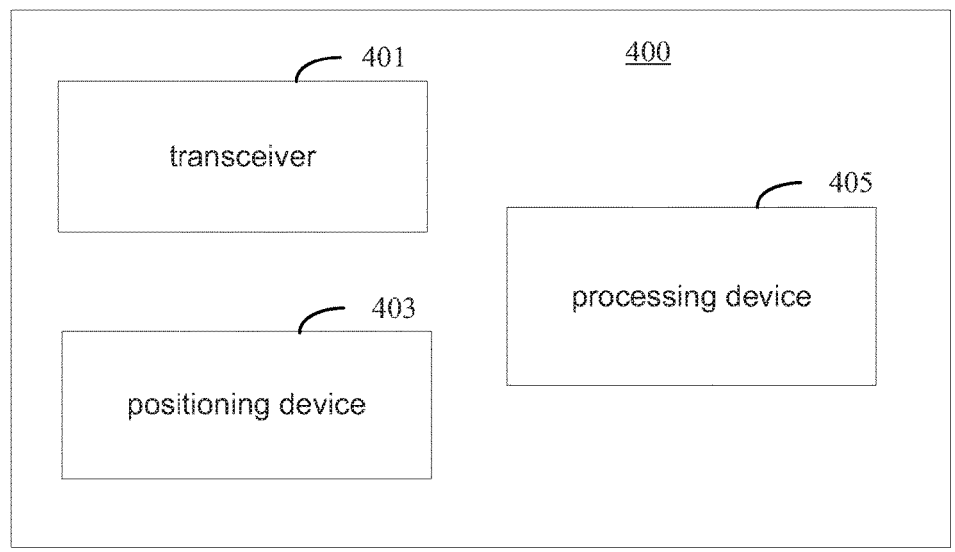
FIG. 7 schematically illustrates a system for accessing a channel in a vehicular communication network according to one embodiment.

Referring to FIG. 7, the system 400 may include a transceiver 401, a positioning device 403 and a processing device 405.

The transceiver 401 may transmit and receive messages in a vehicular communication channel. The positioning device 403 can obtain position information of a node on which the system is mounted. In some embodiments, the positioning device 403 may be a GPS device. The system 400 can perform steps of the method 10. In some embodiments, the processing device 405 may be a CPU, a GPU, a DSP etc., or any combination thereof.

By using method and system according to embodiments of the disclosure, channel access collisions between nodes in a vehicular communication network can be reduced.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for accessing a channel in a vehicular communication network, where successive cycles, each of which comprises N time slots, are defined in the channel, comprising:
    a first communication device mounted on a first node obtaining, with a positioning device, position information of the first node;
    the first communication device receiving a channel allocation advertisement message from a second communication device mounted on a second node, where the channel allocation advertisement message comprises information of how a communication area is divided into M regions and a mapping between the M regions and the N time slots;
    after receiving the channel allocation advertisement message, the first communication device identifying a time slot based on the position information;
    the first communication device competing for the identified time slot; and
    wherein the method further comprises receiving, with the first communication device, periodic messages exchanged between nodes within the communication area, and determining, with the first communication device, a number of nodes within the communication area based on the periodic messages, and
    wherein the first communication device identifying the time slot based on the position information comprises:
        the first communication device determining in which region the first node is located based on a position of the first node and the information of the channel allocation advertisement message; and
        the first communication device identifying the time slot based on the determined region and the mapping.

2. The method according to claim 1, wherein the communication area is determined based on position information and a communication radius of the second node.

3. The method according to claim 1, wherein the channel allocation advertisement message further comprises a lifetime of itself, after which the channel allocation advertisement message is expired.

4. The method according to claim 1, wherein the mapping is established based on a Hash function.

5. The method according to claim 1, further comprising:
wherein the channel allocation advertisement message comprises a node mapping between the N time slots and a plurality of nodes, wherein the node mapping is established based on positions of the nodes;
wherein the communication device identifying the time slot based on the position information further comprises the communication device identifying the time slot based on the node mapping.

6. The method according to claim 1, further comprising:
the second communication device mounted on the second node obtaining the communication area based on position information and a communication radius of the second node;
the second communication device dividing the communication area into M regions; and
the second communication device broadcasting the channel allocation advertisement message comprising the mapping between the M regions and the N time slots to inform nodes within the communication area that each of the nodes is configured to compete for a time slot assigned to a region where it locates according to the mapping.

7. The method according to claim 6, wherein the channel allocation advertisement message further comprises a lifetime of itself, after which the second communication device broadcasts a new channel allocation advertisement message.

8. The method according to claim 6, wherein the mapping is established based on a Hash function.

9. A system for accessing a channel in a vehicular communication network, where successive cycles, each of which comprises N time slots, are defined in the channel, the system comprising a transceiver, a positioning device to obtain position information of a first node on which the system is mounted, and a processing device configured to:
after the transceiver receives a channel allocation advertisement message from a communication device mounted on a second node, wherein the channel allocation advertisement message comprises information of how a communication area is divided into M regions and a mapping between the M regions and the N time slots, determine in which region the first node is located based on the position information of the first node and the information;
identify a time slot based on the determined region and the mapping; and
control the system to compete for the identified time slot,
wherein the transceiver receives periodic messages exchanged between nodes within the communication area, and wherein the processing device is further configured to determine a number of nodes within the communication area based on the periodic messages.

10. The system according to claim 9, wherein the channel allocation advertisement message further comprises a lifetime of itself, after which the channel allocation advertisement message is expired.

11. The system according to claim 9, wherein the mapping is established based on a Hash function.

12. The system according to claim 9, wherein the communication area is determined based on position information and a communication radius of the second node.

13. A system for accessing a channel in a vehicular communication network, where successive cycles, each of which comprises N time slots, are defined in the channel, the system comprising a transceiver, a positioning device to obtain position information of a first node on which the system is mounted, and a processing device configured to:
obtain a communication area based on the position information and a communication radius of the first node;
divide the communication area into M regions;
generate a channel allocation message which comprises a scheme of allocation of the N time slots among the M regions; and
control the transceiver to broadcast the channel allocation message to inform nodes within the communication area that each of the nodes is configured to compete for a time slot allocated to a region where it locates according to the allocation scheme,
wherein the transceiver receives periodic messages exchanged between the nodes within the communication area, and wherein the processing device is further configured to determine a number of nodes within the communication area based on the periodic messages.

14. The system according to claim 13, wherein the channel allocation message further comprises a lifetime of itself, where the processing device is further configured to control the transceiver to broadcast a new channel allocation message after the lifetime expires.

15. The system according to claim 13, wherein the allocation scheme is established based on a Hash function.

16. The system according to claim 13, wherein the processing device is configured to divide the communication area into M regions based on the determined number of nodes.

* * * * *